United States Patent [19]

Tisma

[11] Patent Number: 5,144,790
[45] Date of Patent: Sep. 8, 1992

[54] HIGH SPEED AUTOMATIC PACKAGING MACHINE WITH ANTI-CENTRIFUGAL FORCE TRANSPORT MEANS

[75] Inventor: Stevan Tisma, Chicago, Ill.

[73] Assignee: Tisma Machinery Corporation, Chicago, Ill.

[21] Appl. No.: 612,419

[22] Filed: Nov. 13, 1990

Related U.S. Application Data

[63] Continuation-in-part of Ser. No. 431,378, Nov. 3, 1989, Pat. No. 4,928,556.

[51] Int. Cl.⁵ .................... B65B 1/06; B65B 37/02; B65B 39/14
[52] U.S. Cl. ..................... 53/251; 53/255; 141/140; 198/793; 198/802
[58] Field of Search .......... 53/506, 154, 493, 55, 53/154, 237, 247, 251, 252, 255, 393; 141/140, 142; 198/793, 802

[56] References Cited

U.S. PATENT DOCUMENTS

| | | | |
|---|---|---|---|
| 2,642,212 | 6/1953 | Currivan | 53/252 |
| 3,091,903 | 6/1963 | Kammerer | 53/260 |
| 3,317,029 | 5/1967 | Goldammer et al. | 198/802 |
| 3,608,701 | 9/1971 | Dieter | 198/802 |
| 3,906,705 | 9/1975 | Beck et al. | 53/252 |
| 4,333,297 | 6/1982 | Küttenbaum et al. | 53/252 |
| 4,856,566 | 8/1989 | Tisma | 141/140 X |
| 4,890,724 | 1/1990 | Loewenthal | 198/802 X |
| 4,982,556 | 1/1991 | Tisma | 53/251 X |

*Primary Examiner*—Horace M. Culver
*Attorney, Agent, or Firm*—Laff, Whitesel, Conte & Saret

[57] ABSTRACT

A high speed automatic packaging machine is constructed from standardized modules in order to reduce cost and standardize operational and maintenance procedures. The standardized modules include conveyor chains trained over sprocket wheels to form modules which may be ganged to maintain synchronization of operations. Various types of mandrels may be attached to the conveyor chain in order to adapt the machine to load different types of products. The mandrels experience significant centrifugal forces as they go around the path defined by the sprocket wheels. To prevent the mandrels from slapping the conveyor chain when it is traveling at high speed, a leading end of the mandrel is pivotly connected to the chain while a trailing end of the mandrel is captured within a slot which allows the mandrel to go around the sprocket wheel without departing therefrom.

9 Claims, 8 Drawing Sheets

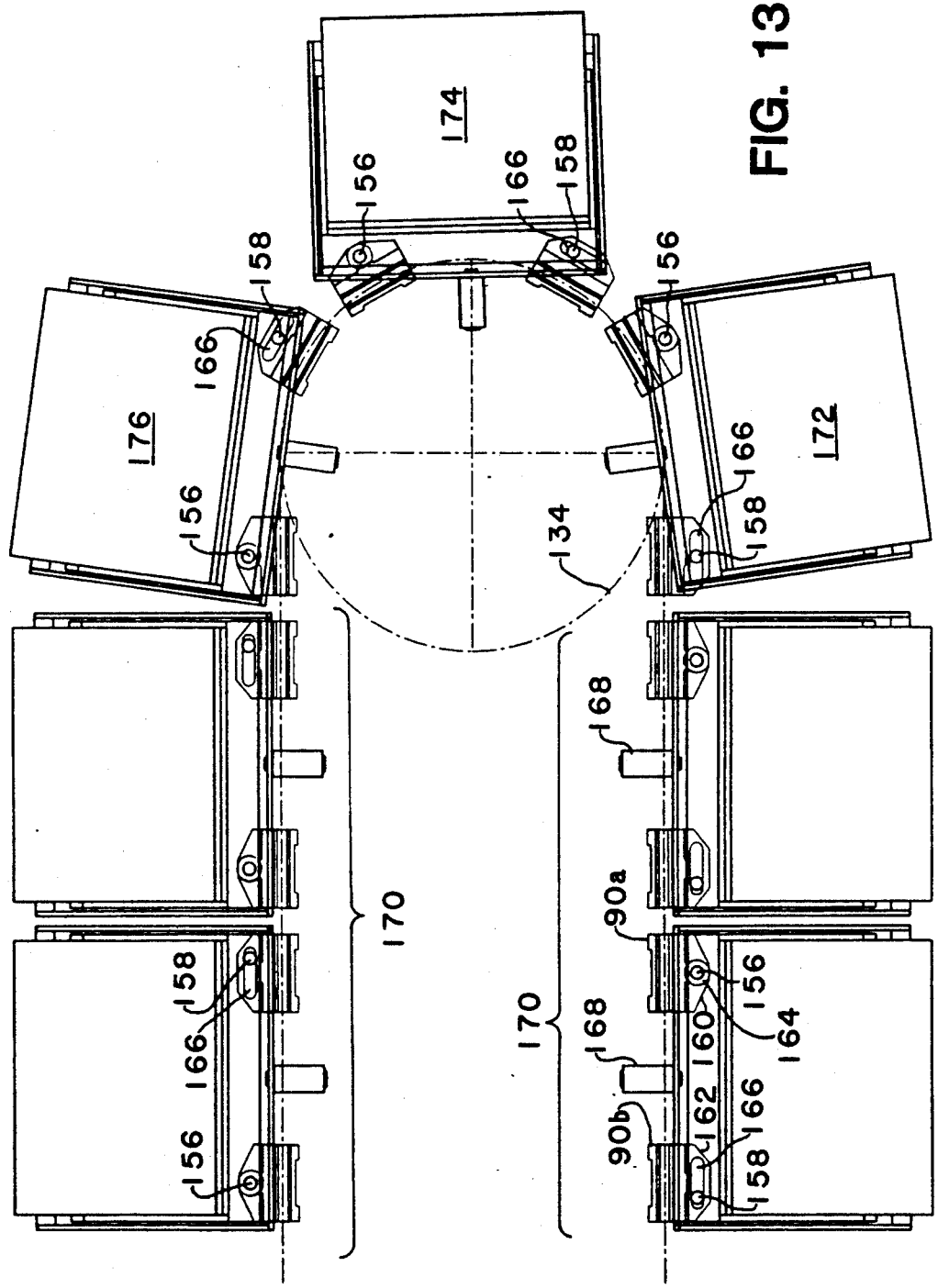

HIGH SPEED AUTOMATIC PACKAGING MACHINE WITH ANTI-CENTRIFUGAL FORCE TRANSPORT MEANS

This is a continuation-in-part of Ser. No. 07/431,378 filed Nov. 3, 1989, now U.S. Pat. No. 4,928,556.

This invention relates to high speed automatic packaging machines and more particularly to anti-centrifugal force transports for such machines.

Patents relating to this and related types of automatic packaging machines are: U.S. Pat. Nos. 4,578,929; 4,713,928; 4,716,714; 4,738,081; 4,745,732; 4,829,751; and 4,856,566. Still more of such automatic packaging machines are shown in my co-pending applications: Ser. No. 07/349,224, now U.S. Pat. No. 5,010,929; Ser. No. 07/431,378, now U.S. Pat. No. 4,982,556; Ser. No. 07/463,116, now U.S. Pat. No. 5,058,634; and Ser. No. 07/464,162, now abandoned.

Automatic packaging machines usually have a magazine filled with cardboard blanks which are picked up, one at a time, by vacuum cups, formed into boxes, and inserted into individual mandrels. Link chain conveyors carry the mandrels past various work stations, where the boxes are filled with product, closed, sealed, and discharged. The mandrels circle back to receive the next empty boxes, after the filled boxes are discharged. Other link chains carry other mandrels, fill cups, transfer funnels and the like.

These link chains normally form long, somewhat oval, closed transport paths having two spaced parallel side paths joined at their ends by a semi-circular pattern where the chain goes around a sprocket wheel which causes centrifugal forces at the ends of the transport path. Since the measure cups, mandrels, funnels, etc. ("mandrels") are bolted to the chain, they endlessly circle about the transport path. Usually, the mandrels have a rectangular or other suitable cross section and are attached to the chain at the center of such cross section. This means that the ends of the cross section are free to separate and jerk away from and toward the chain as the mandrels go around the circular pattern.

If the mandrels are small enough, and the load which they carry is light enough, no problem results from the centrifugal forces. However, when the mandrels are large and heavy to carry, say, ten pounds of sugar, for example, there are problems if attempts are made to build a faster loading machine (i.e. the link chains are driven faster). Perhaps the width of the mandrel is in the order of the radius of the circle formed by the sprocket wheel. At some point, centrifugal forces acting on the centrally supported mandrel flings the ends of the mandrel away from the chain by a significant distance as it goes around the circular path. When a large and heavy mandrel leaves the circular path and then returns to the straight sides of the transport path, it rebounds and strikes a heavy blow against the chain and its supporting structure. Heretofore, the speed at which the automatic packaging machine can operate has been restricted by the centrifugal forces which so tend to fling the ends of the mandrel outwardly and then cause the rebound.

Another consideration is the need for commonality of design for automatic packaging machines and more particularly to automatically controlled and modularly constructed packaging machines. Each product has its own peculiar characteristics and packaging needs. For example, some product may be a hand full of small items (such as peanuts, for example) which are poured into a box. Flour is a large volume, heavy substance. Parts might be pencils, felt tipped markers, golf balls, or almost anything else which can be boxed. Food poses severe sanitation problems and constraints requiring a frequent cleaning of the packaging machines. Many other special packaging considerations pose problems; therefore, the list of special considerations could go on.

Heretofore, it has been customary to design an entirely new and completely custom made machine for packaging each product. This is expensive from all view points since it requires custom engineering and production by the company manufacturing the automatic packaging machine. At the users end, workers, operators, maintenance and other support people often have to learn new skills for almost every machine installed in a plant.

Yet, another consideration is the controls for such a machine. If every machine has its own peculiar construction and operating sequence, procedures, and the like, the control circuits are also custom designed. This tends to defeat the concept that a packaging machine should be controlled by a computer or other automatic control system. Even when such computerized automatic controls are built into a customized packaging machine, the operator's knowledge is dedicated to that machine. Therefore, if a busy packaging company or department has a number of different machines, it is unlikely that a single operator could operate all machines without a substantial amount of special training for each machine. Also, it is unlikely that an employee with the office type of skills required to run a computer could also service and maintain the packaging machine.

For these and many other reasons, it is desirable to provide as much commonality as possible between automatic packaging machines. This means that a desirable machine would be assembled from standard modules which could be put together in different configurations in order to serve the different packaging needs of different products. If they are standard modules, common compatible control circuits could be readily adapted to the needs of many different machines. One operator should then be able to control many different machines.

Accordingly an object of this invention is to provide new and novel means for and methods of constructing automatic packaging machines. In this connection, an object is to drive the automatic packaging machine at higher speeds. Here, an object is to provide a modular type of construction which may be assembled in a plurality of different configurations in order to provide different forms of automatic packing machines which are free of problems caused by centrifugal forces.

A further object of this invention is to provide automatic packaging machines which may be operated at higher speeds even when unusually heavy and large mandrels are carried by the link chain transport conveyor. Here an object is to reduce the effect of centrifugal action upon the very heavy mandrel.

In keeping with an aspect of this invention, these and other objects are accomplished by a use of a basic link chain conveyor which may be made in any of many of different standard sizes and assembled into different conveyor configurations. These chain modules may be adapted to transport different types of standardized mandrels for carrying different kinds of products to many work stations where product is dumped into mandrels and then the contents of the mandrels are dumped into boxes, for example. A novel means for mounting mandrels on the link chain involves a pivot connection on a leading edge of the mandrel with a guide pin in a slot for stabilizing the trailing edge of the mandrel. This form of mounting means virtually eliminates problems of centrifugal forces flinging the mandrel away from and then slamming it into the transport chain. This freedom from unwanted mandrel motion enables the speed of the automatic packaging machine to be increased in the order of 100%.

Preferred embodiments of the invention may be understood from the attached drawings, in which:

FIG. 1 is a perspective view of an automatic packaging machine which is shown and described in U.S. Pat. No. 4,856,566;

FIGS. 2-7, taken from co-pending application Ser. No. 07/431,378, (now U.S. Pat. No. 4,982,556) are exemplary schematic diagrams illustrating how various numbers and sizes of the chain module of FIG. 1 may be laid out and assembled to make different customized conveyors for automatic packaging machines;

FIG. 8 is a perspective view of a prior art connector module which may be bolted to a link chain conveyor;

FIG. 9 schematically shows a conveyor chain module with a plurality of the mandrels of FIG. 8 attached thereto;

FIG. 13 shows how the mandrel behaves responsive to centrifugal forces when it is mounted on the inventive connector of FIG. 12.

Figure 1:
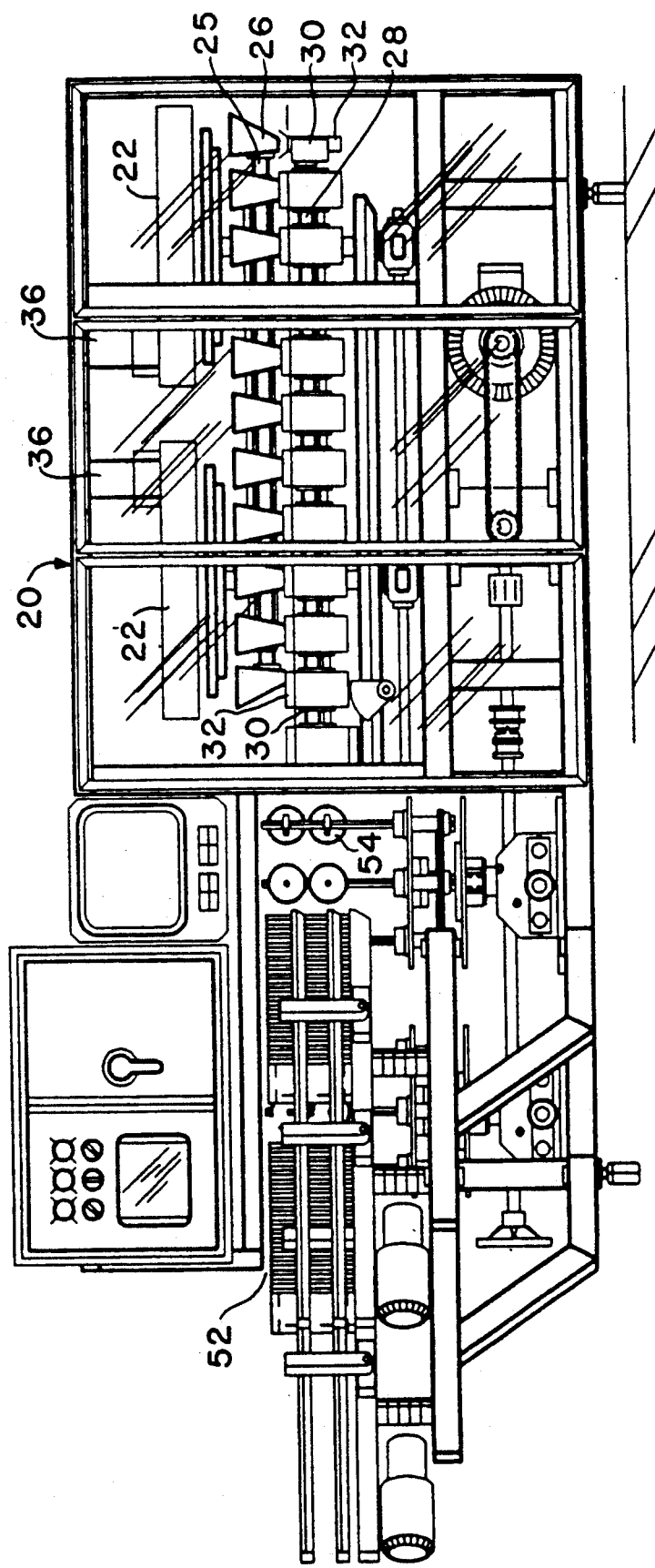

FIG. 1 discloses an automatic packaging machine, which may incorporate the invention. This machine is also shown and described in U.S. Pat. No. 4,856,566. The superstructure 20 raises and lower two conveyors in the form of merry-go-rounds 22, 22 for carrying a number of bottomless volumetric or measuring cups. An endless conveyor 25 carries a number of bottomless, wear resistant transfer funnels or chutes 26 which travel under and in alignment with the measuring cups. A conveyor chain 28 carries a number of mandrels 30 for transporting boxes 32 past a fill station, in alignment with the traveling funnels or chutes 26 in order to guide and direct product falling from bottomless transfer cups into boxes 32.

The remaining parts of FIG. 1 are jack screws 36, 36 which may raise or lower the merry-go-round 22 to accommodate various sizes of measuring caps. A glue station seals the boxes after they are filled. Any suitable product discharge device, such as a conveyor, may pick up and remove the boxes after they are filled and sealed. Two magazines 52 store cardboard blanks which are picked up by suction cup feeders 54 that thereafter press the blanks into the mandrels 30, forming them into boxes, in the process.

This figure illustrates a number of different places where link chain transports may convey mandrels that could employ the inventive connector. More specifically, the merry-go-rounds 22 could be adapted to carry mandrels. The conveyors 25, 28 are link chains which actually do carry mandrels. Still other devices may be built into the machine where the centrifugal forces acting upon the mandrel may be overcome by the inventive connector.

Figure 2:
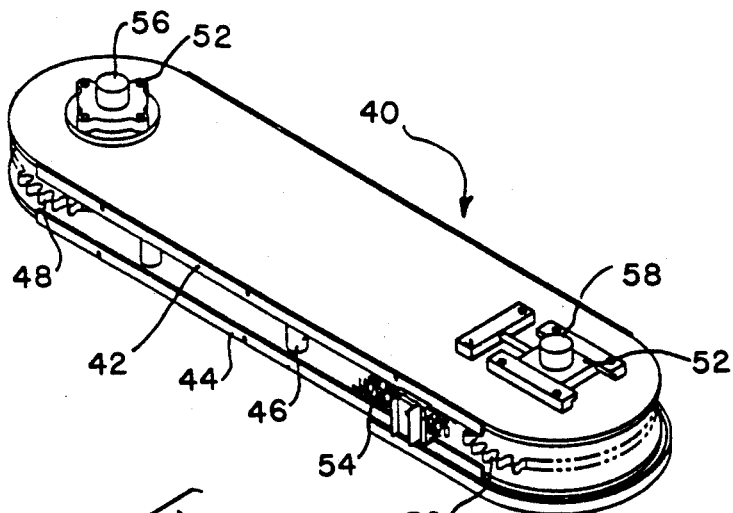

FIG. 2 shows a link chain module 40 which may be used as conveyor 25 or 28 in the automatic packaging machine of FIG. 1. This same module design may be used in any of many different standardized sizes and may be assembled in many different configurations.

The major components of the chain module are a pair of spaced parallel plates 42, 44 which are bolted to each other as at 46, to form a rigid structure. At each end of the plates, and positioned between them are two journal mounted, sprocket wheels 48, 50. Suitable bearings 52 are secured to the plates 42, 44 in order to rotatably mount each of the sprocket 48, 50 wheels between the two plates 42, 44. An endless link-chain 54 is trained over the two sprocket wheels 48, 50. Drive shafts, such as 56, 58, may be attached to either or both of the sprocket wheels in order to either drive them or transfer driving energy between chain modules and, perhaps, other mechanisms associated with the modules.

FIGS. 2-7 schematically illustrate a number of different exemplary layouts for the chain modules 40. Preferably, there are several lengths of the chain modules. Thus, for example, two short modules may be placed beside one long module, with one short module shaft 56 driving one module and another shaft driving the other modules responsive to energy transferred through chain 60. This arrangement locks the movement of all modules in a single timing program.

Figure 3:
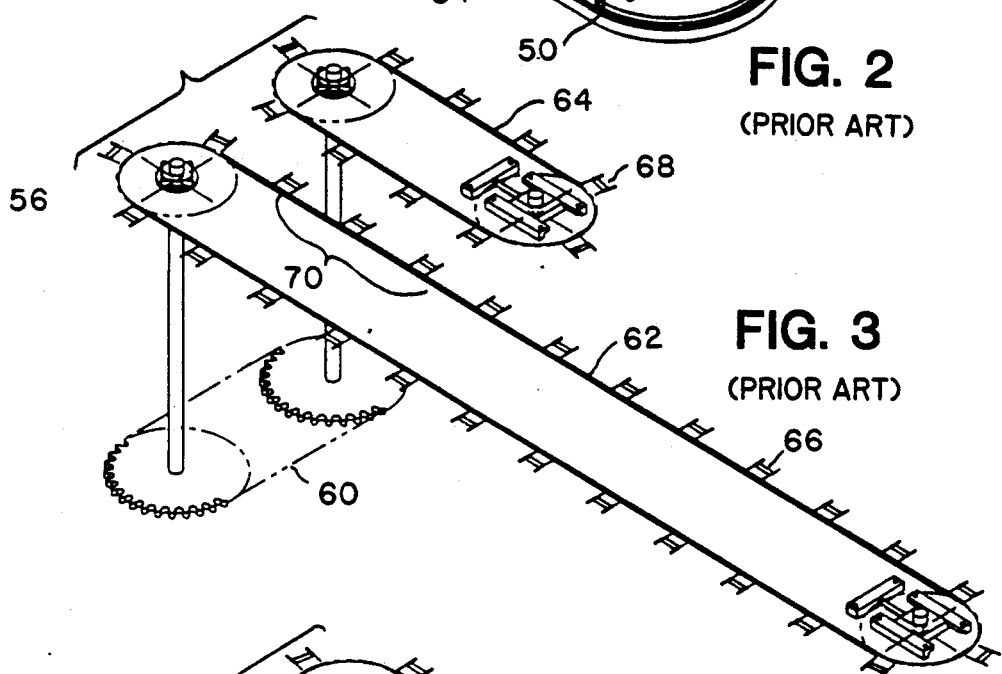
Figure 4:
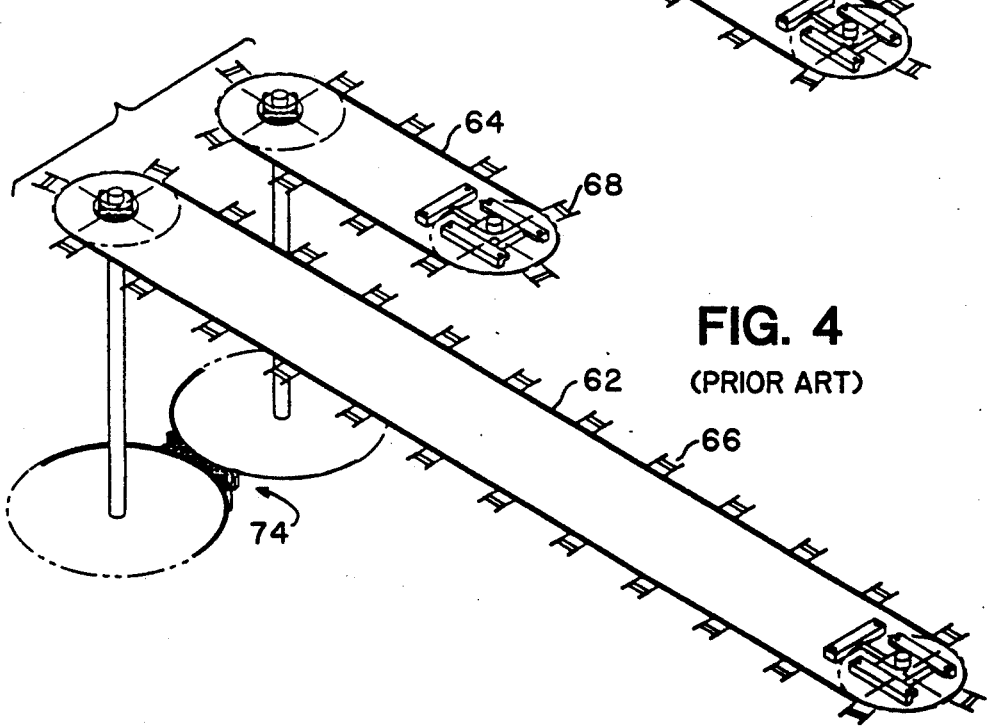

FIGS. 3, 4 show a simple packaging machine having two horizontally oriented chain modules 62, 64. In this simple orientation, boxes might be carried by mandrels 66 attached to chain module conveyor 62 while product is carried by mandrels 68 attached to chain module 64, for example. The product is transferred into the boxes in area 70 where mandrels carried by the two chain modules confront each other. Chain module 64 is here shown shorter than module 66 since more work stations are required to form, fill, close, seal, and deliver boxes as compared to the number of work stations required to pick up and dump product into the boxes. Thus, long chain module 62 passes many work stations. Short module 64 passes a few stations. FIG. 3 shows the two modules driven in synchronism by a common link chain 60. FIG. 4 shows gears 74 used as a similar synchronizing drive for two chain modules.

Figures 5, 6, 7:
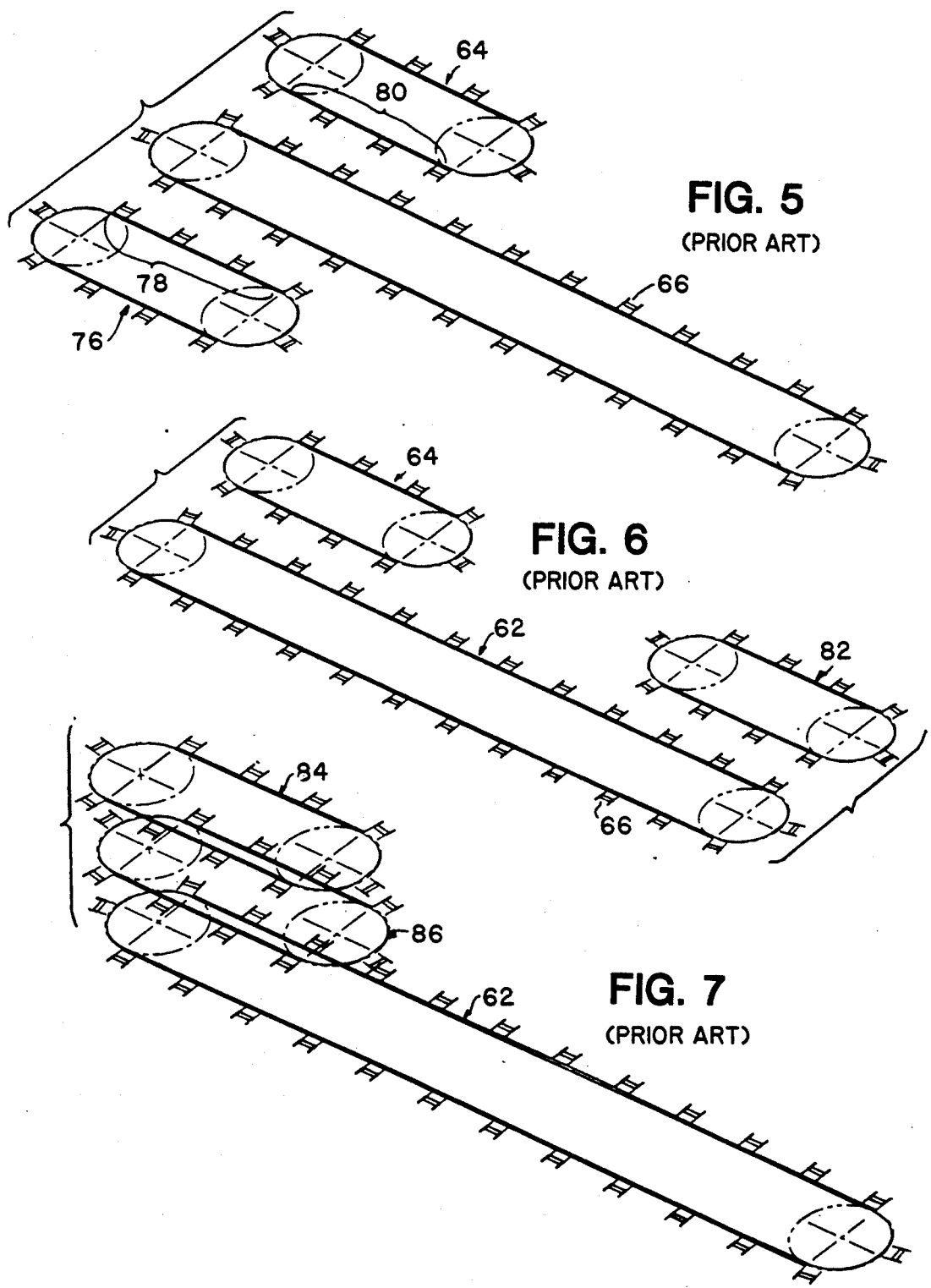

In FIG. 5, a third chain module conveyor 76 confronts the long-chain module 62 in area 78 on a side opposite chain module 64 in order to perform a second function. For example, each box carried in a mandrel 66 may have two compartments. One product may be dumped into one compartment in area 78. A second product may be dumped into a second compartment in area 80. Or, the long chain module 62 may be driven twice as fast if every other box in a mandrel 66 is filled in area 78 and the remaining boxes are filled in area 80.

In FIG. 6, the second chain module 82 and first module 66 are on the same side of the long box carrying chain module 62. This configuration might be best for the convenience of a work force or to fit into a specific floor area. Or, for some other reason such as to accommodate different time requirements, it might be preferable to prepare the boxes in mandrels 66 as they travel a short distance between work stations at modules 64 and 82 on the far side of module 62, as compared to forming the boxes while mandrels 66 travel from module 82 to module 64 over the long path on the near side of module 62.

In FIG. 7, the chain modules 62, 84, 86 are stacked vertically to perform still other functions. For example, work stations for doling out measured quantities of product (such as 10-pounds sugar) may be associated with chain modules 84 (i.e. similar to merry-go-rounds 22), funnels 26 might be associated with chain module 86, and boxes might be associated with chain module 62. Thus, in such a case, the heavy quantity of sugar may be poured from a mandrel being carried by chain 84 through a funnel on chain 86, and into a box on claim 62.

Still more complex arrangements of chain conveyors could be shown. Therefore, examples of how various chain modules may be assembled could be multiplied, almost endlessly. In some cases, the shafts on the various modules may be a single common shaft passing through several modules. Some of the chain modules may be driven by separate shafts which are coupled together by chains or gears so that one or more shafts are driven as slaves of the other. A single motor may thus synchronously drive all of the chains in a single timing schedule, by a use of a common linkage.

Figure 8:
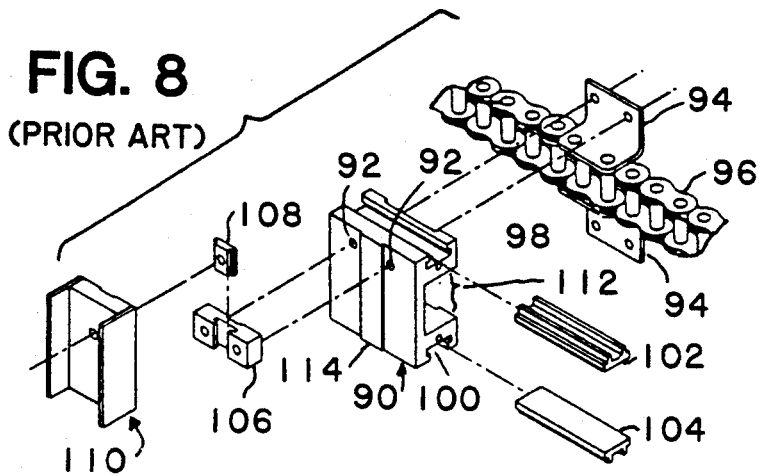

A prior art connector part for attaching this mandrel to a conveyor chain is seen in FIG. 8. A slide block 90 (i.e. a single piece of metal) may be either a machined or die cast part, for example. Bolt holes 92 enable the part 90 to be bolted to mounting brackets 94 on the link chain conveyor 96. The part 90 includes upper and lower T-shaped slots 98, 100, into which nylon tracks 102, 104 slide in order to ride on rails (not shown) adjacent conveyor chain 96. These rails carry the weight of the conveyor chain and the mandrels attached thereto. A mating coupler 106, 108 is provided to enable any suitable mandrel 110 to be slipped into and then latched in place. The conveyor link chain fits into the channel 112 in slide block 90. Various embossments and guideways are provided to index and maintain a proper position alignment between the conveyor chain 96, connectors 106, 108 and mandrel 110. Accordingly, each of the "H" shaped symbols in FIGS. 2-7 may be construed as being any "suitable mandrel".

Figure 9:
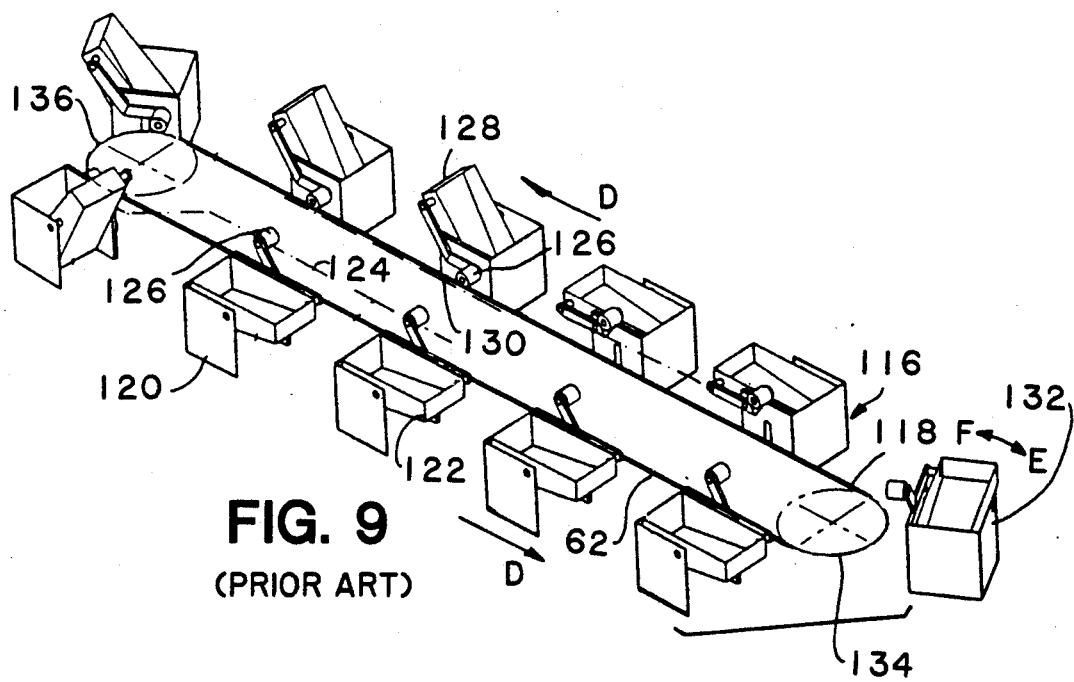

FIG. 9 illustrates how a plurality of the mandrels 116 may be carried by a conveyor chain 118. Beginning at position 120 the mandrel trays 122 are in a horizontal position to receive and carry product. At this point a profile 124 of a track side cam is relatively high, to support roller 126 in a high position, thus forcing the tray 122 into a horizontal position. As the mandrels travel in direction D, they receive and carry product.

In position 128, the profile 130 of the track side cam is lower and at a level which lowers the roller 126, thus tipping the tray downwardly and dumping product into a box (not shown). The low track side cam profile 130 continues to hold the tray in a tipped position until the mandrel returns to position 120, where the cam profile 124 goes to a high level returning the tray to the horizontal product carrying position. The tray remains tipped for a period of time which is adequate to enable a full charge of the product to fall into a box. During this period of time, the product delivery cup, transfer funnel, and box carrying mandrel travel together.

The problem which the invention addresses is illustrated at 132 (FIG. 9), where centrifugal force causes mandrel 132 to try to swing outwardly in direction E and to slam back in direction F as the mandrel goes around the circle defined by sprocket wheels at the opposite ends, 134, 136 of the long oval transport track.

Figure 10:
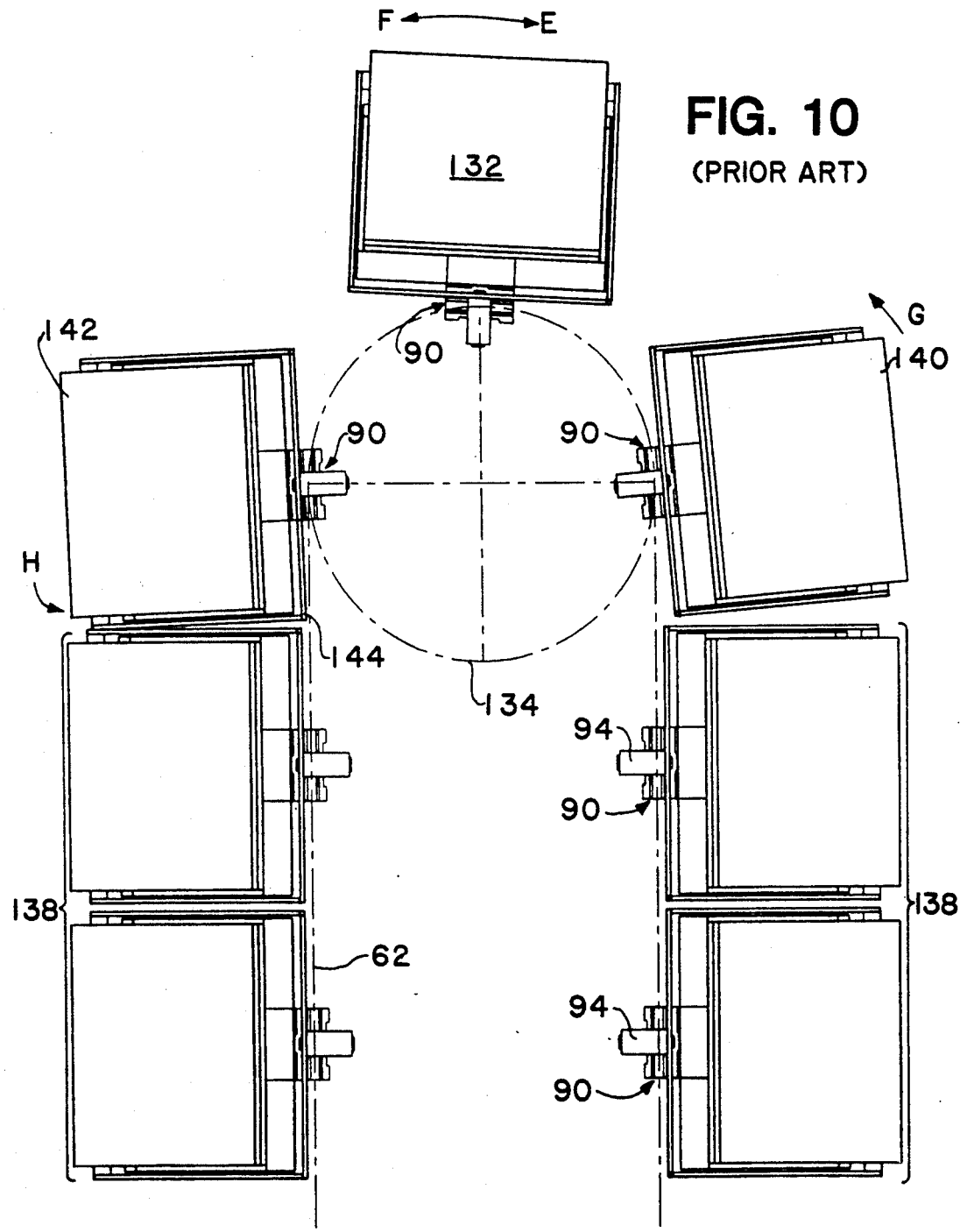
FIG. 10 shows how the mandrel with the prior art mount of FIG. 8 behaves responsive to centrifugal forces which appear as it goes around the circle formed by the sprocket wheel at the end of the elongated oval transport path.

This problem is shown in greater detail in FIG. 10 which is a top plan view, looking down on FIG. 9. As here shown, mandrels 138 are traveling without problems along the straight sections of the conveyor chain 62. However, when the mandrel 140 enters upon the circular end section 134, there is a strong centrifugal force tending to rotate the mandrel in direction G. There may be a jerkiness as the mandrel swings back and forth in directions E, F, when it circles in the position 134 of the track end sprocket wheel. When the mandrel returns to the straight section at position 142, the swinging mandrel slams into the conveyor at point 144 with a blow here represented by the arrow H. With this kind of action, the mandrel may soon hammer itself out of shape and greatly damage the conveyor chain, especially when the mandrel is carrying heavy loads such as five or ten pounds, for example.

Heretofore, this hammering has limited the speed of the automatic packaging machine to levels which cause a smooth transit of the circular regions. The invention provides a means for increasing the speed of the packaging machine by a factor which may be in the order of 100%, for example.

Figure 11:
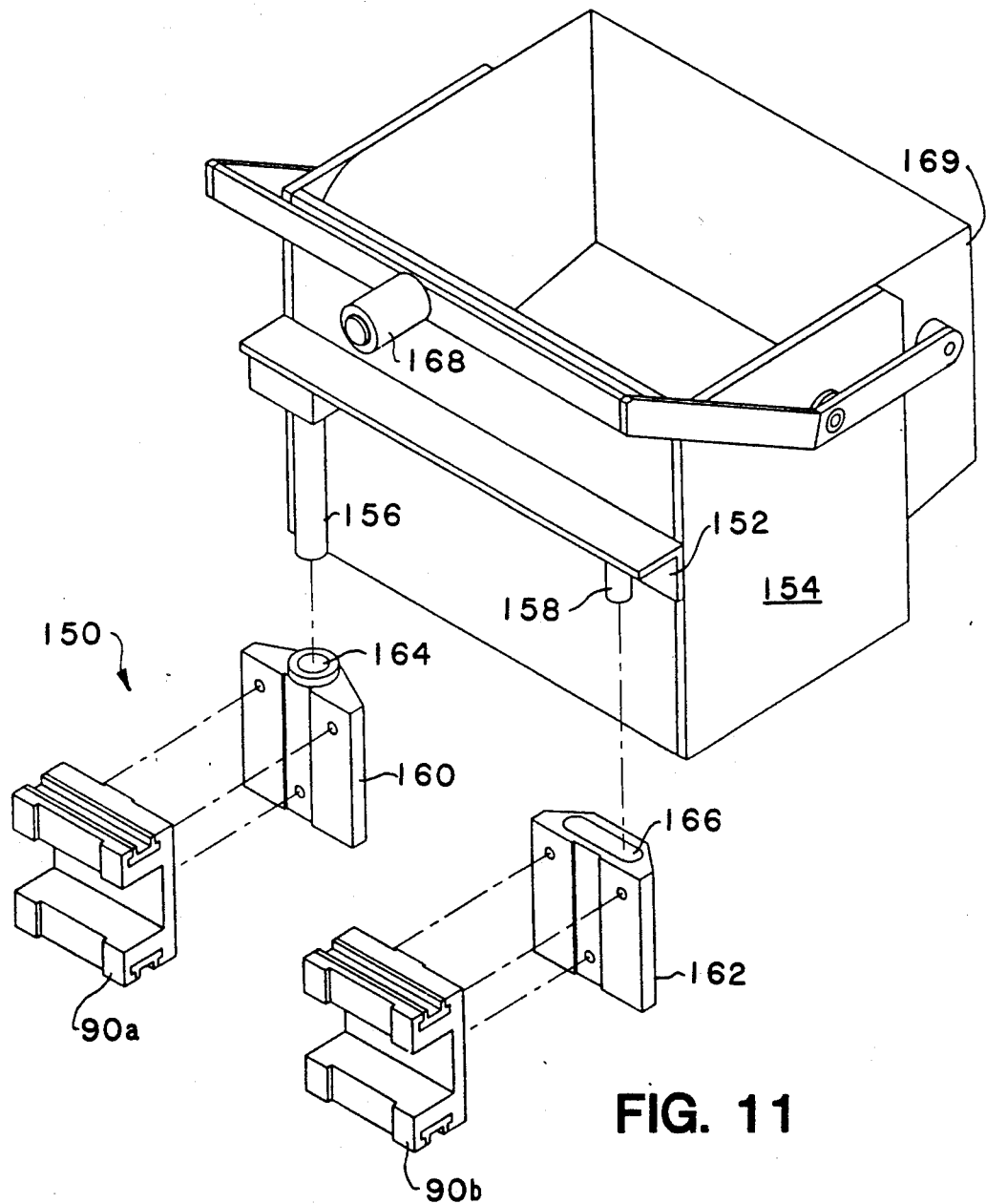
FIG. 11 is an exploded view of the inventive mandrel and its support.

The inventive connector 150 (FIG. 11) replaces the prior art connector 90 of FIG. 8 in order to cope with the centrifugal forces acting upon the mandrel. In greater detail, as best seen in FIG. 11, the inventive connector 150 comprises an angle iron 152 bolted across the back of the mandrel 154. Dependent from the angle iron 152 is a pivot pin 156 on one side of the mandrel and a guide pin 158 on the other side of the mandrel. Two of the slide block pieces of metal 90a and 90b (as shown in FIG. 8) are bolted to the conveyor chain at positions corresponding to the space between pivot and guide pins 156, 158. A pivot block 160 is bolted to slide block 90a. A guide block 162 is bolted to slide block 90b. The pivot block has a hole 164 for receiving pivot pin 156, thereby making a hinge connection between the leading edge of the mandrel and the conveyor chain. The guide block 162 includes a slot 166 which is long enough to provide travel for the guide pin as the mandrel traverses the circular path at 134.

The roller 168 controls the attitude of a tray 169 on the mandrel 154, much as described above in connection with roller 126 (FIG. 9) which controls the attitude of tray 128.

Figure 12:
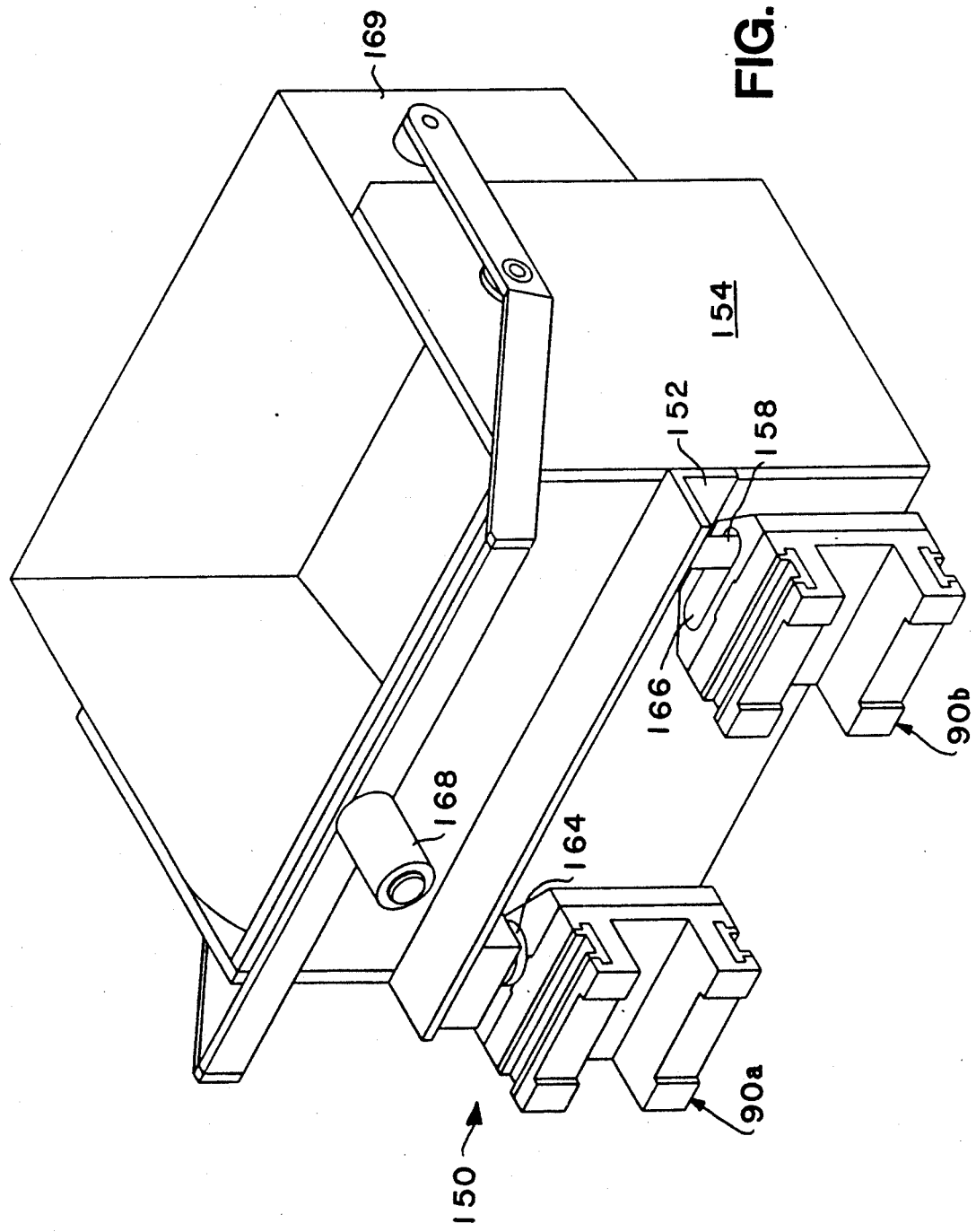
FIG. 12 shows the inventive mandrel connector with a mandrel assembled thereon.

The assembly of the mandrel 154 and connector 150 is shown in FIG. 12. As here shown the mandrel was simply set on the connector by inserting pivot pin 156 into the hole 164 and guide pin 158 into the slot 166. Any suitable means may be provided to hold the mandrel in place after it is set in place.

The operation of the inventive connector of FIG. 11 is seen in FIG. 13. In the two regions 170, the mandrels are following a straight section of the transport path being pulled along by pivot pin 156 and with guide pin 158 in the trailing end of slot 166. When the mandrel 172 reaches the circular section 134 of the transport path, it is still being pulled by the pivot pin 156 while the guide pin 158 moves to the center of guide slot 166. At the center of the circular path 134, the mandrel 174 is being pulled by pivot pin 156, while guide pin 158 has moved to the leading end of guide slot 166. As the mandrel 176 moves back onto the straight section 70 of the transport path the guide pin 158 is moving back through the slot 166, to the trailing edge thereof.

The point of FIG. 13 is that the two ends of the mandrel are always tied to the conveyor chain so that there is none of the whipping back and forth which is exhibited in FIG. 10. When the mandrel returns to the straight section, the force represented by arrow H is minimal because the pins 156, 158 are held in close proximity to and do not substantially depart from the transport path.

Those who are skilled in the art will readily perceive how to modify the invention. Therefore, the appended claims are to be construed to cover all equivalent structures which fall within the true scope and spirit of the invention.

The claimed invention is:

1. An automatic packaging machine including at least one conveyor chain forming a long closed and somewhat oval path for transporting mandrels through said machine; a plurality of mounting blocks attached to said chain at periodic locations along the length thereof, said mounting blocks alternately having a hole or a slot formed therein; each of said mandrels having a pivot pin on one end and a guide pin on the other end; said holes and said slots being oriented to be perpendicular to said conveyor chain; said pins, said holes, and said slots being shaped and sized so that said mandrels may be mounted and dismounted on said chain by sliding said pins into said holes and said slots; said holes receiving said pivot pins in a manner which make a pivoting connection between said one end of said mandrel and said chain said slots receiving said guide pins in a manner which makes a sliding connection between said other end of said mandrel and said chain; and means associated with said chains and mandrels for transferring product from a source to packages for containing said product.

2. The automatic packaging machine of claim 1 wherein each of said holes is associated with one of said blocks at a leading end of said mandrel for receiving said pivot pin, and said each of said slots is associated with another of said blocks at a trailing end of said mandrel, said slots having a length corresponding to a distance traveled by said guide pin while said pivot pin pulls said mandrel around said long and closed somewhat oval path.

3. The automatic packaging machine of claim 2 wherein there are at least two of said conveyor chains, each of said conveyor chains carrying a plurality of said mounting blocks for carrying a plurality of said mandrels, said conveyor chains being juxtaposed so that said mandrels traveling on different chains are suspended to travel in synchronism with each other in a manner which enables them to cooperate for transferring and packaging product.

4. The automatic packaging machine of claim 3 wherein each of said conveyor chains comprises a chain module which has a pair of elongated plates with a sprocket wheel between said plates and at each end thereof, a link chain trained over said sprocket wheels for forming said long and somewhat oval path, each of said sprocket wheels being mounted on and turning with a shaft extending perpendicularly with respect to said plate, and means for transferring power to said chain modules comprising means for interconnecting selected ones of said shafts, whereby all of said chain modules move in synchronism when power is applied to only one of said shaft.

5. The automatic packaging machine of claim 1 wherein a plurality of said conveyor chains are assembled into chain modules which are in juxtaposition and with at least one of said chain modules confronting at least one other of said chain modules in at least one location where product carried in a mandrel on one of said conveyor chains may be transferred to a mandrel carried by another of said conveyor chains, means for transferring driving power through said conveyor chain modules for operating them in a predetermined synchronism, and a plurality of different types of mandrels, each of said chains having an associated type of said mandrels attached thereto for carrying different types of product and for performing transfer functions between said conveyor chains.

6. The automatic packaging machine of claim 5 wherein at least one track side cam controls the attitude of said mandrel, said attitude controlling cam means extending along a length of said chain module for selectively controlling and tipping said tray between product carrying and product dumping positions at locations along said length of chain which are marked by said track side cam means.

7. In a packaging machine, the improvement comprising a high speed conveyor having at least one flexible link chain trained over spaced apart sprocket wheels to define a circular part of a transport path, mandrel means, means for pivotally attaching a leading end of said mandrel means to be pulled by said chain for endlessly circling said transport path whereby centrifugal forces experienced by said mandrel means occur at its trailing end as it circles the sprocket wheels, and separate slidable means for holding said trailing end of said mandrel means in close association with said link chain at least during periods while said mandrel means experiences said centrifugal force, said close association accomodating said centrifugal force while preventing said attaching means from slapping said link chain under the influence of said centrifugal force.

8. The machine of claim 7 and a plurality of attaching means connected at periodic locations along a length of said link chain; said pivotal attachment being made by a downwardly extending pin from each end of said mandrel means, a pair of said attaching means containing connector means for receiving said dependent pins, one of said pins and connector means forming said pivoting connection between the leading end of said mandrel means and a leading one of said attached means, and the other of said pins and connector means forming a guide for holding said attached means against said link chain during periods when said mandrel means experiences said centrifugal force.

9. The machine of claim 8 wherein one of said pins forming said pivot connection is a relatively long pin and the other of said pins is a relatively short pin, said short pin fitting into a slot in said holding means.

* * * * *